United States Patent
Yin

(10) Patent No.: US 8,867,392 B2
(45) Date of Patent: Oct. 21, 2014

(54) HANDOFF OF A MOBILE DEVICE MOVING AT A HIGH RELATIVE VELOCITY TO BASE STATIONS FOR A WIRELESS NETWORK

(75) Inventor: Xuefeng Yin, Shanghai (CN)

(73) Assignee: Empire Technology Development LLC, Wilmington, DE (US)

( * ) Notice: Subject to any disclaimer, the term of this patent is extended or adjusted under 35 U.S.C. 154(b) by 78 days.

(21) Appl. No.: 13/508,985

(22) PCT Filed: Jun. 16, 2011

(86) PCT No.: PCT/CN2011/075798
§ 371 (c)(1),
(2), (4) Date: May 9, 2012

(87) PCT Pub. No.: WO2012/171194
PCT Pub. Date: Dec. 20, 2012

(65) Prior Publication Data
US 2013/0064220 A1    Mar. 14, 2013

(51) Int. Cl.
*G06F 11/00* (2006.01)
*H04L 1/00* (2006.01)
*H04L 12/26* (2006.01)
*H04W 36/00* (2009.01)
*H04W 36/32* (2009.01)

(52) U.S. Cl.
CPC .......... *H04W 36/0083* (2013.01); *H04W 36/32* (2013.01)
USPC ............................ 370/252; 370/253; 370/254

(58) Field of Classification Search
CPC .......... H04L 41/12; H04L 45/02; H04L 45/00
USPC ........................... 370/252, 253, 254; 375/260
See application file for complete search history.

(56) References Cited

U.S. PATENT DOCUMENTS

| | | | |
|---|---|---|---|
| 4,419,766 A | 12/1983 | Goeken et al. | |
| 2002/0119779 A1* | 8/2002 | Ishikawa et al. | 455/437 |
| 2007/0047493 A1* | 3/2007 | Park et al. | 370/331 |
| 2007/0177510 A1* | 8/2007 | Natarajan et al. | 370/238 |
| 2007/0286298 A1* | 12/2007 | Choi et al. | 375/260 |
| 2008/0056390 A1* | 3/2008 | Rainbolt et al. | 375/260 |
| 2009/0052504 A1* | 2/2009 | Tanae | 375/149 |
| 2009/0303891 A1* | 12/2009 | Lucas et al. | 370/252 |
| 2010/0080178 A1* | 4/2010 | Cox et al. | 370/329 |
| 2010/0080194 A1* | 4/2010 | Kawasaki et al. | 370/332 |
| 2012/0170480 A1* | 7/2012 | Ido et al. | 370/252 |

FOREIGN PATENT DOCUMENTS

| | | |
|---|---|---|
| CN | 1395429 A | 2/2003 |
| CN | 1889770 A | 1/2007 |
| CN | 101442786 A | 5/2009 |
| EP | 2332368 A1 | 6/2011 |

OTHER PUBLICATIONS

Link level simulation assumptions for UE in high speed trains, 3GPP TSG-RAN Working Group 4 (Radio) R4-051281, Nov. 2005, accessed online on May 7, 2012 via http://www.3gpp.org/ftp/tsg_ran/wg4_radio/TSGR4_37/Docs/.

(Continued)

*Primary Examiner* — Chuong T Ho
(74) *Attorney, Agent, or Firm* — Brundidge & Stanger, P.C.

(57) ABSTRACT

Examples are disclosed for handoff of a mobile device moving at a high relative velocity to a plurality of base stations for a wireless network.

39 Claims, 7 Drawing Sheets

(56) References Cited

OTHER PUBLICATIONS

Initial ideal simulation results for different high speed propagation scenarios, SGPP TSG-RAN Working Group 4 (Radio) R4-051724, Nov. 2005, accessed online on May 7, 2012 via http://www.3gpp.org/ftp/tsg_ran/wg4_radio/TSGR4_37/Docs/.

On UE DCH performance requirements in high speed trains, SGPP TSG-RAN Working Group 4 (Radio) R4-051282, Nov. 2005, accessed online on May 7, 2012 via http://www.3gpp.org/ftp/tsg_ran/wg4_radio/TSGR4_37/Docs/.

Discussion on AFC problem under high speed train environment, SGPP TSG-RAN Working Group 4 Meeting No. 38, NTT DoCoMo., R4-060149, Feb. 2006, accessed online on May 7, 2012 via http://www.3gpp.org/ftp/tsg_ran/WG4_Radio/TSGR4_38/Docs/.

The State Intellectual Property Office, International Search Report & Written Opinion of the International Searching Authority for PCT/CN2011/075798, mailed on Mar. 22, 2012, China.

\* cited by examiner

600 A computer program product.

602 A signal bearing medium.

604 instructions for a handoff of a mobile device in a wireless network, which, when executed by logic, cause the logic to:

receive a baseband representation of signals determined from training symbols associated with measuring wireless communication channel conditions between the mobile device and a base station from among a plurality of base stations within the wireless network, the mobile device moving at a high relative velocity;

determine a Doppler frequency power spectral density based, at least in part, on the baseband representation of signals;

assign a handoff priority to the base station based, at least in part, on the Doppler frequency power spectral density; or determine whether to initiate the handoff of the mobile device to the base station based, at least in part, on the handoff priority.

| 606 a computer-readable medium. | 608 a recordable medium. | 610 a communications medium. |

FIG. 6

HANDOFF OF A MOBILE DEVICE MOVING AT A HIGH RELATIVE VELOCITY TO BASE STATIONS FOR A WIRELESS NETWORK

BACKGROUND

Unless otherwise indicated herein, the approaches described in this section are not prior art to the claims in this application and are not admitted to be prior art by inclusion in this section.

A mobile device that is moving between coverage areas of base stations for a wireless network may require efficient and relatively seamless handoffs. Conventionally, a handover or handoff operation may be performed based on a comparison of certain characteristics or parameters associated with the mobile device and base stations. These characteristics or parameters may be associated with an active communication channel connection between the mobile device and a base station and may also be associated with potential communication channel connections between the mobile device and other/target base stations. Typically, characteristics or parameters may include narrowband communication channel characteristics such as received signal strength (RSS), signal to noise ratio (SNR), signal to interference ratio (SIR), or signal to interference and noise ratio (SINR). Characteristics or parameters may also include geometric characteristics of the anchor or active base station, geometric characteristics of a target base station and the mobile device. These geometric characteristics may include a distance between the mobile device and the active base station, a distance between the mobile device and the target base station, and a velocity of the mobile device. Further, the characteristics or parameters may also include parameters for indicating system operation performance such as traffic load, bit error rate (BER) or other types of system operation performance parameters. A handoff operation may be activated or initiated when the above-mentioned characteristics or parameters exceed and/or fall below predetermined thresholds.

SUMMARY

The present disclosure describes example methods for a handoff of a mobile device in a wireless network. The methods may include receiving a baseband representation of signals determined from training symbols associated with measuring wireless communication channel conditions between the mobile device and a base station from among a plurality of base stations within the wireless network. The mobile device may be moving at a high relative velocity. A Doppler frequency power spectral density may then be determined based on the baseband representation of signals. A handoff priority may then be assigned to the base station based on the Doppler frequency power spectral density. In some examples, a determination may then be made on whether to initiate the handoff of the mobile device to the base station based, at least in part, on the handoff priority.

The present disclosure also describes example devices for a handoff of a mobile device in a wireless network. The example devices may have a handoff manager that has logic. The logic may be configured to receive a baseband representation of signals determined from training symbols associated with measuring wireless communication channel conditions between the mobile device and a base station from among a plurality of base stations within the wireless network. The mobile device may be moving at a high relative velocity. The logic may also be configured to determine a Doppler frequency power spectral density based on the baseband representation of signals and then assign a handoff priority to the base station based on the Doppler frequency power spectral density. In some examples, the logic may also be configured to initiate the handoff of the mobile device to the base station based, at least in part, on the handoff priority.

The present disclosure also describes example systems for a handoff of a mobile device in a wireless network. The example systems may include an antenna to receive baseband representation of signals training symbols measuring wireless communication channel conditions between the mobile device and a base station from among a plurality of base stations within the wireless network. The mobile device may be moving at a high relative velocity. The example system may also include a handoff manager. The handoff manager may have logic configured to determine a Doppler frequency power spectral density based on the baseband representation of signals and then assign a handoff priority to the base station based on the Doppler frequency power spectral density. In some examples, the logic may also be configured to initiate the handoff of the mobile device to the base station based, at least in part, on the handoff priority.

The present disclosure also describes example computer program products. In some examples, the computer program products may include a signal bearing medium having instructions for a handoff of a mobile device in a wireless network. The instructions, which, when executed by logic may cause the logic to receive a baseband representation of signals determined from training symbols associated with measuring wireless communication channel conditions between the mobile device and a base station from among a plurality of base stations within the wireless network. The mobile device may be moving at a high relative velocity. Responsive to the received baseband representation of signals, the instructions may also cause the logic to determine a Doppler frequency power spectral density based on the baseband representation of signals and then assign a handoff priority to the base station based on the Doppler frequency power spectral density. According to some examples, the instructions may then cause the logic to determine whether to initiate the handoff of the mobile device to the base station based, at least in part, on the handoff priority.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 illustrates a block diagram of an example computer program product; and

Figure 1:
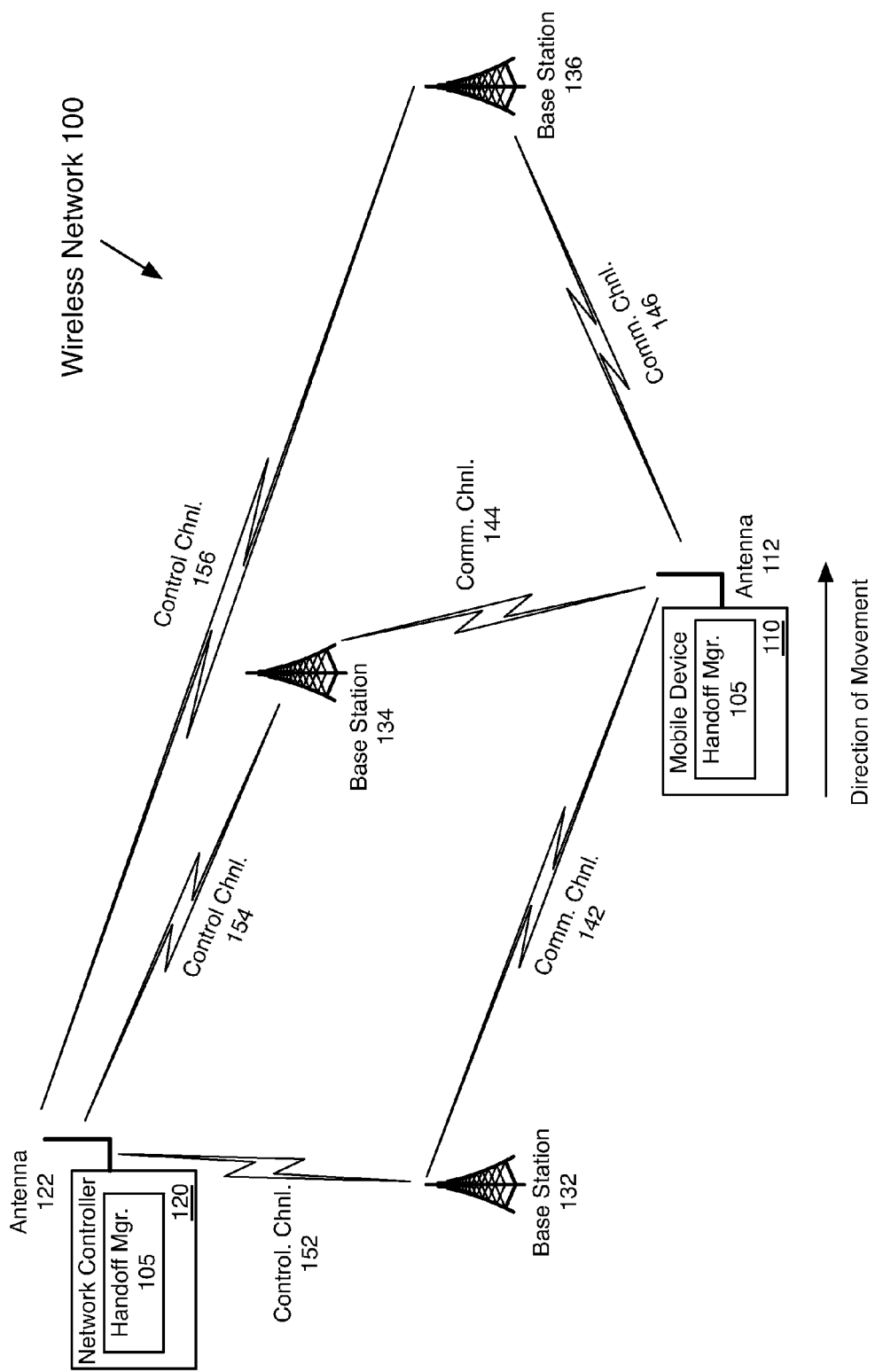
FIG. 1 illustrates an example wireless network to implement a handoff of a mobile device.

all arranged in accordance with the present disclosure.

DETAILED DESCRIPTION

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products for a handoff of a mobile device in a wireless network.

As contemplated in the present disclosure, a handoff operation may be activated or initiated when conventionally used characteristics or parameters exceed and/or fall below predetermined thresholds. A handoff using these characteristics or parameters may be smoothly implemented using conventional handoff algorithms or techniques based on the mobile device moving at a relatively low velocity. However, as the mobile device moves at relatively higher velocities, the handoff using conventional handoff algorithms may be problematic and, unreliable.

In some examples, methods are implemented for a handoff of a mobile device in a wireless network. The methods may include receiving a baseband representation of signals determined from training symbols associated with measuring wireless communication channel conditions between the mobile device and a base station from among a plurality of base stations within the wireless network (e.g., exchanged via multiple consecutive data frames). The mobile device may be moving at a high relative velocity. A Doppler frequency power spectral density may then be determined based on the baseband representation of signals. A handoff priority may then be assigned to the base station based on the Doppler frequency power spectral density. In some examples, a determination may then be made on whether to initiate the handoff of the mobile device to the base station based, at least in part, on the handoff priority.

FIG. 1 illustrates an example wireless network 100 to implement a handoff of a mobile device. As shown in FIG. 1, wireless network 100 includes a mobile device 110, a network controller 120 and base stations 132, 134 and 136. In some examples, as shown in FIG. 1, mobile device 110 may have a direction of movement towards base station 136. FIG. 1 also shows that mobile device 110 may be communicatively coupled to base stations 132, 134 and 136 via communication channels 142, 144 and 146, respectively. Further, in some examples, as shown in FIG. 1, base stations 132, 134 and 136 may also be communicatively coupled to network controller 120 via control channels 152, 154 and 156, respectively. Also, as shown in FIG. 1, mobile device 110 includes an antenna 112 and network controller 120 includes an antenna 122. Further, as described more below, mobile device 110 and/or network controller 120 may include a handoff manager 105 that may include logic and/or features configured to initiate a handoff of mobile device 110 to a base station (e.g., to base station 136).

In some examples, mobile device 110 may utilize antenna 112 to communicatively couple to base stations 132, 134 and 136. Also, network controller 120 may utilize antenna 122 to communicatively couple to these base stations. Although not shown in FIG. 1, network controller 120 may also communicatively couple to base stations 132, 134 and 136 via other types of control channels that may include wired or wireless control channels and may utilize other means than antenna 122 to communicatively couple to these base stations.

In some examples, mobile device 110 may be moving at high relative velocity to base stations 132, 134 or 136 (e.g., over 100 kilometers per hour). For these examples, mobile device 110 may have an active communication channel with base station 132, but may be reaching the limits of the coverage area for base station 132 and thus may need to handoff to either base station 134 or base station 136. Prior to a handoff, mobile device 110 may exchange information (e.g., in multiple consecutive data packets or data frames) with base station 134 to measure wireless communication channel conditions for communication channel 144 and may also exchange information with base station 136 to measure wireless communication channel conditions for communication channel 146. The exchanged information, for example, may include training symbols included in preambles for data packets exchanged between mobile device 110 and base stations 134 and 136.

According to some examples, a handoff manager 105 included in or resident with mobile device 110 may be configured to receive and/or exact separate baseband representations of signals from the training symbols. As mentioned above, the training symbols may be associated with measuring wireless communication channel conditions for communication channel 144 to base station 134 and for communication channel 146 to base station 136. As described more below, handoff manager 105 may be configured to determine or calculate separate Doppler frequency power spectral densities for communication channel 144 and communication channel 146. Handoff manager 105 may also be configured to assign a handoff priority to base station 134 and base station 136 based, at least in part, on the separate Doppler frequency power spectral densities. For example, although mobile device 110 may be physically closer to base station 134, the high relative velocity of mobile device 110 towards base station 136 may result in a calculated Doppler frequency power spectral density that indicates a handoff to base station 136 would be a higher priority compared to a handoff to base station 134. For this example, handoff manager 105 may be further configured to initiate the handoff of mobile device 110 to base station 136 based on base station 136 having a higher assigned priority. Mobile device 110 may then attempt to complete a handoff to base station 136 to consequently make communication channel 146 the active communication channel for mobile device 110 to couple to wireless network 100.

According to some other examples, a handoff manager 105 included in or resident with network controller 120 may be configured to receive or obtain separate baseband representation of signals from information exchanged between mobile device 110 and base stations 134 and 136. For these other examples, base stations 134 and 136 may forward the information via respective control channel 154 and 156. As mentioned previously, the exchanged information may include training symbols associated with measuring wireless communication channel conditions for each base station's communication channel with mobile device 110. Similar to a handoff manager 105 at mobile device 110, the handoff manager 105 at network controller 120 may be configured to determine separate Doppler frequency power spectral densities for each base station's communication channel with mobile device 110, assign a handoff priority and initiate a handoff based on the assigned priority. For these other examples, the handoff manager 105 at network controller 120 may initiate the handoff by either indicating to the base station its status of having the highest priority or indicating to mobile device 110 which station has the higher priority. The base station or mobile device 110 may then attempt to complete the handoff.

Figure 2:
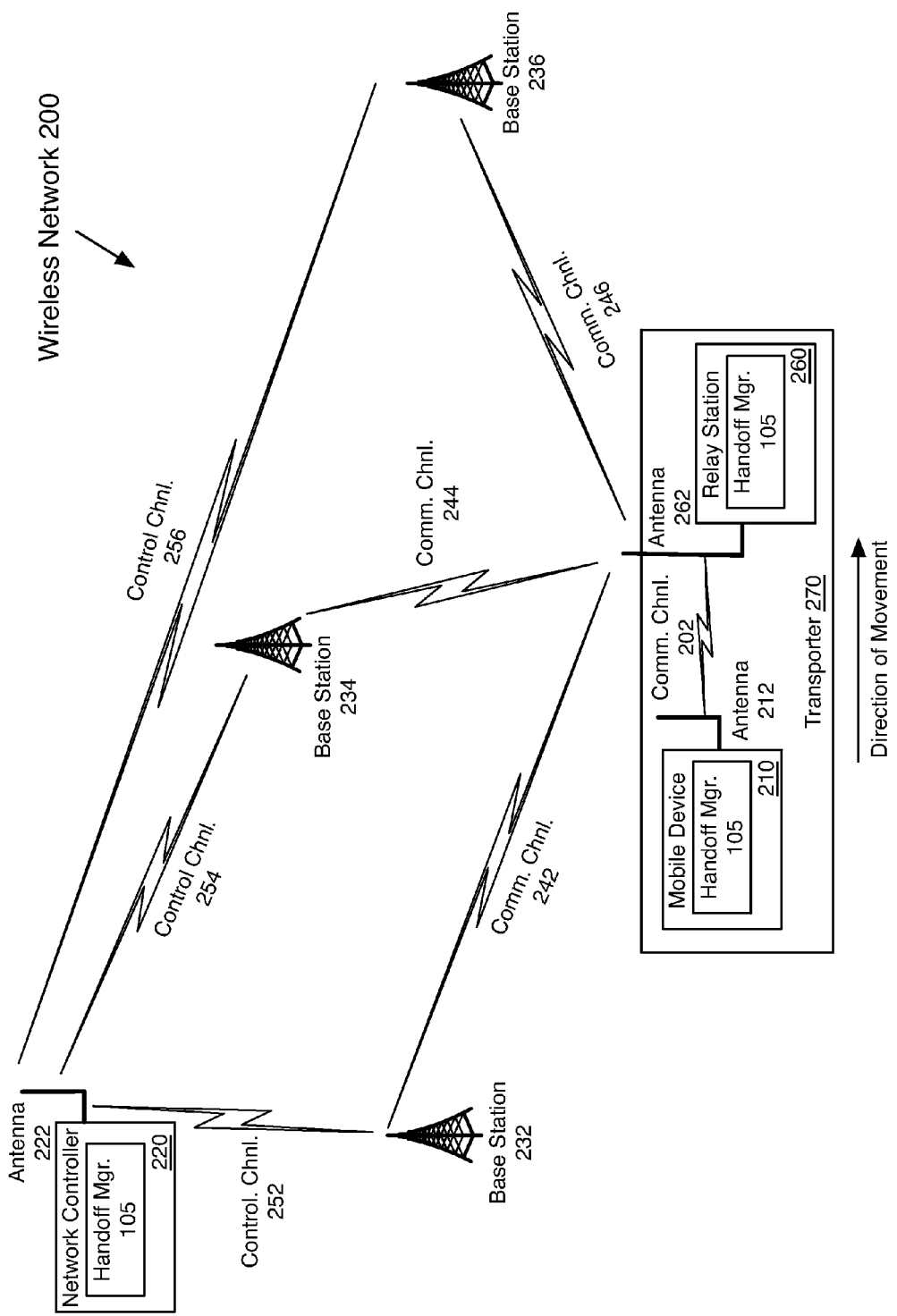
FIG. 2 illustrates another example wireless network to implement a handoff of a mobile device coupled to a relay station.

FIG. 2 illustrates an example wireless network 200 to implement a handoff of a mobile device coupled to a relay station. As shown in FIG. 2 and similar to FIG. 1, wireless network 200 includes a mobile device 210, a network controller 220 and base stations 232, 234 and 236. In some examples, as shown in FIG. 2, mobile device 210 may be physically located in a transporter 270 that may have a direction of movement towards base station 236. FIG. 2 also shows that mobile device 210 may be communicatively coupled to a relay station 260 via communication channel 202. Relay station 260 may enable mobile device 210 to couple to wireless network 200 through base stations 232, 234 and 236 via communication channels 242, 244 and 246, respectively. Further, in some examples, as shown in FIG. 2, base stations 232, 234 and 236 may also be communicatively coupled to network controller 220 via control channels 252, 254 and 256, respectively. Also as shown in FIG. 2 mobile device 210 includes an antenna 212, relay station 260 includes antenna 262 and network controller 220 includes an antenna 222. As shown in FIG. 2, mobile device 210, relay station 260 and/or network controller 220 may include a handoff manager 105. Handoff manager 105 may include logic and/or features configured to initiate a handoff of mobile device 210 to a base station (e.g., to base station 236).

In some examples, mobile device 210 may utilize antenna 212 to communicatively couple to relay station 260. Relay station 260 may then utilize antenna 262 to communicatively couple to base stations 232, 234 and 236 and relay communications between mobile device 210 and these base stations. Also, network controller 220 may utilize antenna 222 to communicatively couple to base stations 232, 234 and 236. Although not shown in FIG. 2, network controller 220 may also communicatively couple to base stations 232, 234 and 236 via other types of control channels that may include wired or wireless control channels and may utilize other means than antenna 222 to communicatively couple to these base stations.

In some examples, transport 270 may be moving at high relative velocity to base stations 232, 234 or 236 (e.g., over 100 kilometers per hour) and consequently mobile device 210 may also be moving at a high relative velocity. For these examples, mobile device 210 may have an active communication channel with base station 232 through relay station 260, but mobile device 210/relay station 260 may be reaching the limits of the coverage area for base station 232 and thus may need to handoff to either base station 234 or base station 236. Prior to a handoff, mobile device 210 may use relay station 260 to exchange information (e.g., in one or more data packets) with base station 234 in order to measure wireless communication channel conditions for communication channel 244. Mobile device 210 may also use relay station 260 to exchange information with base station 236 in order to measure wireless communication channel conditions for communication channel 246. The exchanged information, for example, may include training symbols included in preambles for multiple consecutive data frames or data packets exchanged between mobile device 210 and base stations 234 and 236.

According to some examples, similar to mobile device 110 described above for FIG. 1, a handoff manager 105 included in or resident with mobile device 210 may be configured to receive and or extract separate baseband representations of signals from the training symbols. Also, the handoff manager 105 at mobile device 210 may be configured to determine or calculate separate Doppler frequency power spectral densities for communication channel 244 and communication channel 246. The handoff manager 105 at mobile device 210 may also be configured to assign a handoff priority to base station 234 and base station 236 based, at least in part, on the separate Doppler frequency power spectral densities and then determine which base station to initiate a handoff. Mobile device 210 may then attempt to complete a handoff to the base station with the highest assigned priority to establish a different active communication channel for mobile device 210 to couple to wireless network 200 through relay station 260.

In other examples, a handoff manager 105 in or resident with relay station 260 may be configured to receive and or extract separate baseband representations of signals from the training symbols rather than merely forwarding the training symbols to mobile device 210 as mentioned above. For these other examples, the handoff manager 105 at relay station 260 may determine or calculate the separate Doppler frequency power spectral densities for communication channels 144 and 146 and then assign priorities. The handoff manager 105 at relay station 260 may then determine which base station to initiate a handoff and then either indicates to mobile device 210 and/or the higher assigned priority base station that a handoff may be initiated. Mobile device 210 and/or the higher assigned priority base station may then attempt to complete a handoff.

In still other examples, a handoff manager 105 in or resident with network controller 220 may be configured to receive or obtain separate baseband representations from information exchanged between mobile device 210 and/or relay station 260 and base stations 234 and 236. Similar to what was described above for FIG. 1, for these other examples, base stations 234 and 236 may forward the information via respective control channels 254 and 256. Similar to a handoff manager 105 at mobile device 210 or relay station 260, the handoff manager 105 at network controller 220 may be configured to determine separate Doppler frequency power spectral densities for each base station's communication channel with mobile device 210, assign a handoff priority and initiate a handoff based on the assigned priority. For these other examples, the handoff manager 105 at network controller 220 may initiate the handoff by either indicating to the base station its status of having the highest priority or indicating to mobile device 210 (through relay station 260) which station has the higher priority. The base station or mobile device 210 may then attempt to complete the handoff.

In some examples, transport 270 may include any mode of transportation that may move at a high relative velocity to base stations 232, 234 or 236. For example, transport 270 may be a rail car for a high speed train service, an airplane, a bus or other mode of transportation. Although, not shown in FIG. 2, a plurality of mobile devices may be located with or within transport 270 and may separately communicatively coupled to relay station 270 in order to couple to base stations 232, 234 or 236.

In some examples, wireless network 100 describe for FIG. 1 or wireless network 200 described for FIG. 2 may operate according to various types of wireless network technologies. One type of wireless network technology may be described in an industry standard known as Institute of Electrical and Electronics Engineers (IEEE) 802.16-2009 and may be referred to as "WiMax". Another type of wireless network technology may be described in one or more industry standards associated with the $3^{rd}$ Generation Partnership Project such as GSM, GPRS, EDGE, W-CDMA, HSPA, LTE or LTE-Advanced and may be referred to as "3GPP". Yet another type of wireless network technology may be described in one or one or more industry standards associated with the $3^{rd}$ Generation Partnership Project 2 such as CDMA-2000, EV-DO, EV-DO Rev. A or EV-DO Rev. B and may be referred to as "3GPP2".

As mentioned above, network controller 120 in FIG. 1 and network controller 220 in FIG. 2 may be coupled to the various base stations depicted in FIGS. 1 and 2 via wireless control channels. In some examples, these wireless control channels may operate in compliance with one or more industry standards. The one or more industry standards may be associated with 3GPP, 3GPP2, IEEE 802.11-2007, or IEEE 802.16-2009. Also, wired control channels (not shown in FIG. 1 or FIG. 2) may be utilized by network controller 120 or network controller 220 to communicatively couple to base stations in wireless network 100 or 200. These wired control channels may be associated with industry standards such as IEEE 802.1. Although this disclosure is not limited to only the above-mentioned standards.

Figure 3:
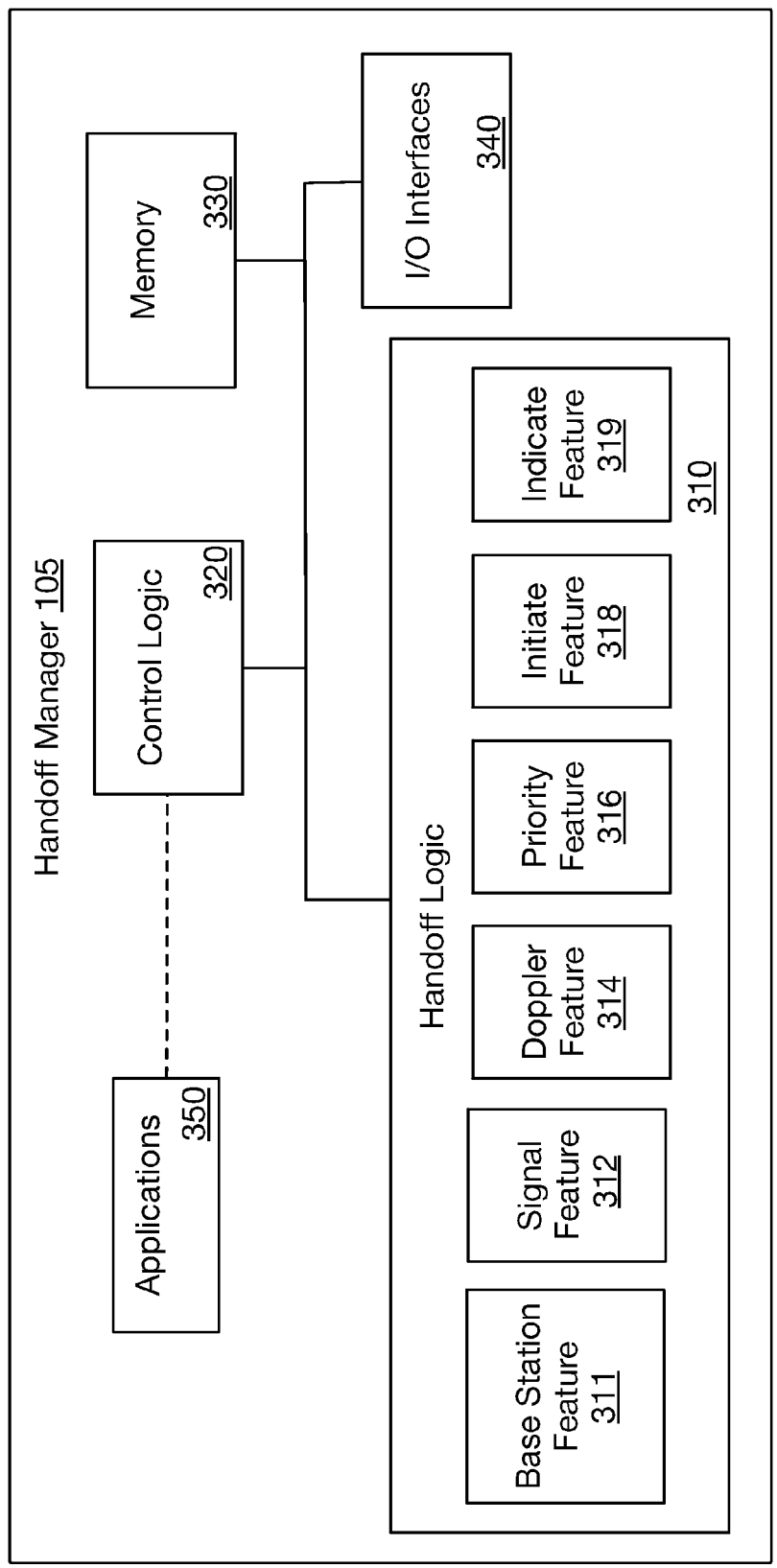
FIG. 3 illustrates a block diagram of an example architecture for a handoff manager.

FIG. 3 illustrates a block diagram of an example architecture for a handoff manager 105. As described above for wireless networks 100 and 200 in FIGS. 1 and 2, mobile devices 110/210, network controllers 120/220 or relay station 260 may separately include a handoff manager 105. In some examples, handoff manager 105 includes features and/or logic configured or arranged to receive baseband representations of signals, determine Doppler frequency power spectral densities, assign handoff priorities and determine whether to initiate a handoff of a mobile device to a base station.

The example handoff manager 105 of FIG. 2, includes handoff logic 310, control logic 320, memory 330, input/output (I/O) interfaces 340 and optionally one or more applications 350. As illustrated in FIG. 3, handoff logic 310 is coupled to control logic 320, memory 330 and I/O interfaces 340. Also illustrated in FIG. 3, the optional applications 350 are arranged in cooperation with control logic 320. Handoff logic 310 may further include one or more of a base station feature 311, a signal feature 312, a Doppler feature 314, a priority feature 316, an initiate feature 318, or an indicate feature 319 or any reasonable combination thereof.

In some examples, the elements portrayed in FIG. 3's block diagram are configured to support or enable handoff manager 105 as described in this disclosure. A given handoff manager 105 may include some, all or more elements than those depicted in FIG. 3. For example, handoff logic 310 and control logic 320 may separately or collectively represent a wide variety of logic device(s) to implement the features of handoff manager 105. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 3, handoff logic 310 includes one or more of a base station feature 311, a signal feature 312, a Doppler feature 314, a priority feature 316, an initiate feature 318, or an indicate feature 319. Handoff logic 310 may be configured to use one or more of these features to perform operations. As described in more detail below, example operations may include determining whether to initiate a handoff a mobile device to a base station based, at least in part, on an assigned priority.

In some examples, control logic 320 may be configured to control the overall operation of handoff manager 105. As mentioned above, control logic 320 may represent any of a wide variety of logic device(s) configured to operate in conjunction with executable content or instructions to implement the control of handoff manager 105. In some alternate examples, the features and functionality of control logic 320 may be implemented within handoff logic 210.

According to some examples, memory 330 is arranged to store executable content or instructions. The executable content or instructions may be used by control logic 320 and/or handoff logic 310 to implement or activate features or elements of handoff manager 105. As described more below, memory 330 may also be arranged to at least temporarily maintain information associated with measuring wireless communication channel conditions (e.g., training symbols). Memory 330 may also be arranged to at least temporarily maintain Doppler frequency power spectral densities determined based on the information associated with measuring wireless communication channel conditions.

Memory 330 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 340 may provide an interface via an internal communication medium or link between a handoff manager 105 and elements resident on or co-located with handoff manager 105. For example, I/O interfaces 340 may provide an interface to elements co-located with handoff manager 105 at a mobile device, relay station or network controller. I/O interfaces 340 may include interfaces that operate according to various communication protocols to communicate over the internal communication link (e.g., Inter-Integrated Circuit ($I^2C$), System Management Bus (SMBus) or Serial Peripheral Interface Bus (SPI), etc.).

I/O interfaces 340 may also provide an interface between handoff manager 105 and elements remote to handoff manager 105 or coupled via networked connections. The I/O interfaces 340, for example, include an interface configured to operate according to various wireless and/or wired communication protocols to allow handoff manager 105 to communicate to these remote elements or to networked elements (e.g., IEEE, 802.1, IEEE 802.11, IEEE 802.16, GSM, GPRS, EDGE, W-CDMA, HSPA, CDMA-2000, EV-DO, LTE, TD-LTE, etc.).

In some examples, handoff manager 105 includes one or more applications 350 to provide instructions to control logic 320 and/or handoff logic 310. Instructions, for example, may include instructions for handoff manager 105 to implement or use one or more of a base station feature 311, a signal feature 312, a Doppler feature 314, a priority feature 316, an initiate feature 318 or an indicate feature 319.

Figure 4A:
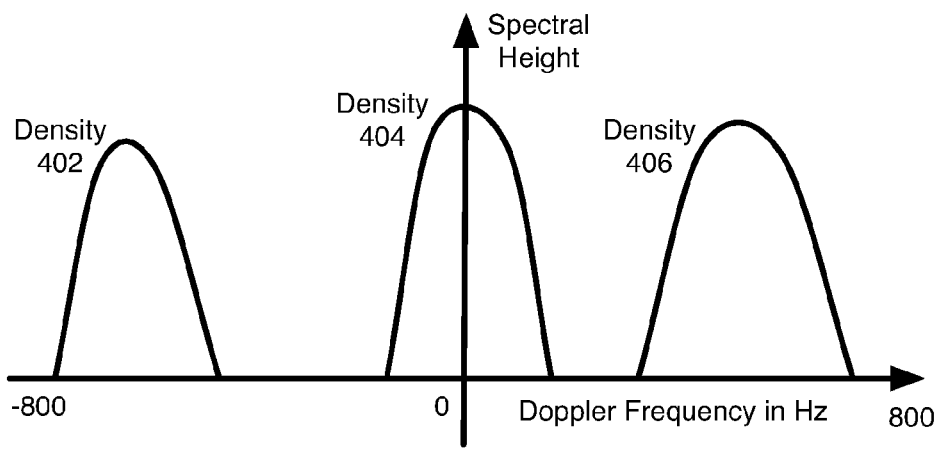
FIGS. 4A-C illustrate Doppler frequency power spectral densities determined from received signals.
Figure 4B:
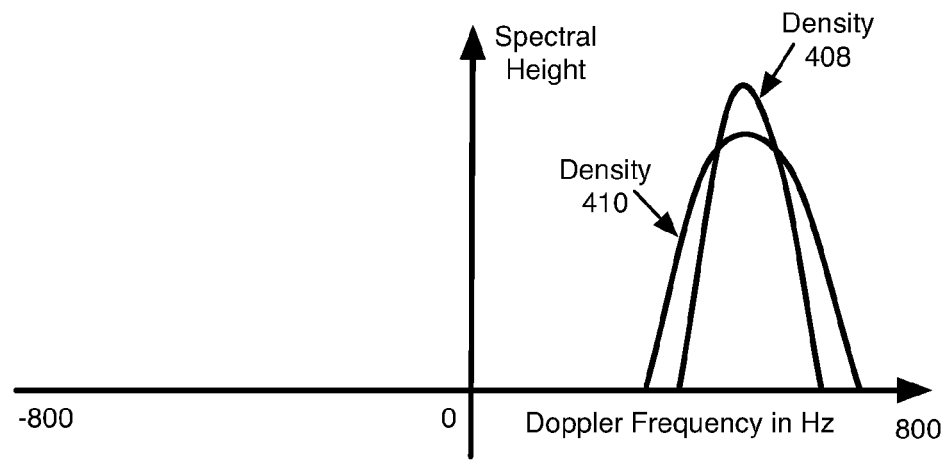
Figure 4C:
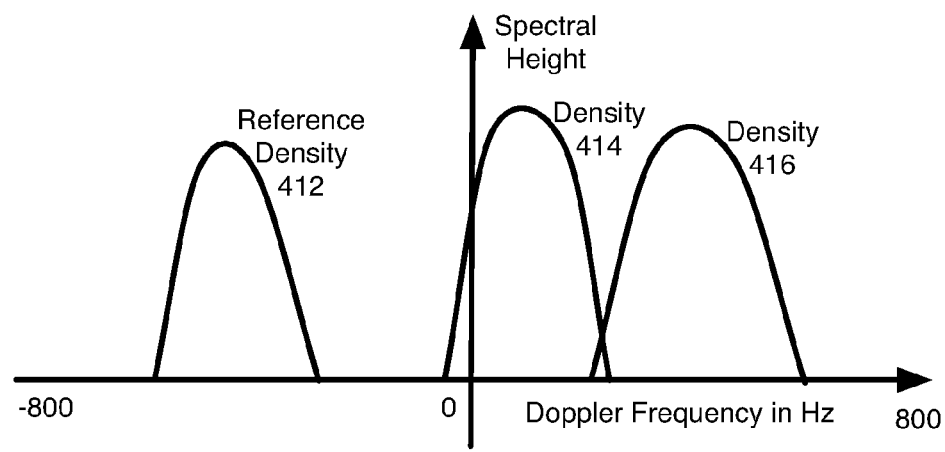

FIGS. 4A-C illustrate Doppler frequency power spectral densities which may be determined from received signals. In some examples, as mentioned above, handoff manager 105 may be configured to calculate or determine Doppler frequency power spectral densities based on separate baseband representations of signals. The separate baseband representations may have been obtained from training symbols associated with measuring wireless communication channel conditions between a mobile device (e.g., mobile device 110) and a plurality of base stations (e.g., base stations 132, 134 or 136). The training symbols may have been obtained from multiple consecutive data frames or data packets exchanged between the mobile device and the plurality of base stations. In some examples, handoff manager 105 may be configured to calculate or determine individual Doppler frequency power spectral densities by using or implementing a Fourier transform algorithm having the separate baseband representations as inputs. The Fourier transform algorithm may be a discrete fast Fourier transform algorithm to increase the speed and decrease the complexity of determining the individual Doppler frequency power spectral densities.

In some examples the strength of Doppler frequency signal between the mobile device and a base station may be illustrated in FIGS. 4A-C on the x-axis and the y-axis which may correlate to both negative and positive values for the Doppler frequency signal in Hertz (Hz). A Doppler frequency power spectral density having a signal peak in a positive Doppler frequency region, for example, may indicate that the mobile device is moving towards a base station associated with a peak in this region. Also, a Doppler frequency power spectral density having a peak in the a negative Doppler frequency region, for example, may indicate the mobile device is moving away from a base station associated with a peak in this region.

FIG. 4A illustrates three separate Doppler frequency power spectral densities that may have been determined based on the exchange between a mobile device moving at a high relative velocity to three different base stations. The separate Doppler frequency power spectral densities for the three base stations are denoted in FIG. 4A as density 402, density 404 and density 406. In some examples, as shown in FIG. 4A, the peak for density 402, may be in the negative Doppler frequency region, density 404 may be in a neutral Doppler frequency region and density 406 may be in a positive Doppler frequency region. Thus, for example, the mobile device may be moving away from the base station associated with density 402, just passing by the base station associated with density 404 and moving towards the base station associated with density 406. In some examples, handoff manager 105 may be configured to assign a higher handoff priority to base stations having a higher positive Doppler frequency. Thus for the three Doppler frequency power spectral densities shown in FIG. 4A, the handoff priority may be the highest for the base station associated with density 406 and the lowest priority may be for the base station associated with density 402.

According to some other examples, two or more Doppler frequency power spectral densities associated with separate base stations may be located in the same Doppler frequency region. For example, as shown in FIG. 4B, density 408 and density 410 have peaks in the same region. In some examples, handoff manager 105 may be configured to assign a higher handoff priority to base stations associated with a Doppler frequency power spectral density having a smaller or narrower spread. Thus for the two Doppler frequency power spectral densities shown in FIG. 4B, the handoff priority may be higher for the base station associated with density 408 since density 408 has a narrower spread as compared to density 410.

In some examples, a reference Doppler frequency power spectral density may be used to determine an assigned handoff priority. For example, as shown in FIG. 4C, density 414 and 416 may be compared to reference density 412 to determine a handoff priority. The closer a peak for a density may be to reference density 412, the higher the priority for the base station associated with that density may be. Thus, in this example, FIG. 4C shows that the peak for density 414 may be closer to reference density and therefore the handoff priority may be higher for the base station associated with density 414.

Figure 5:
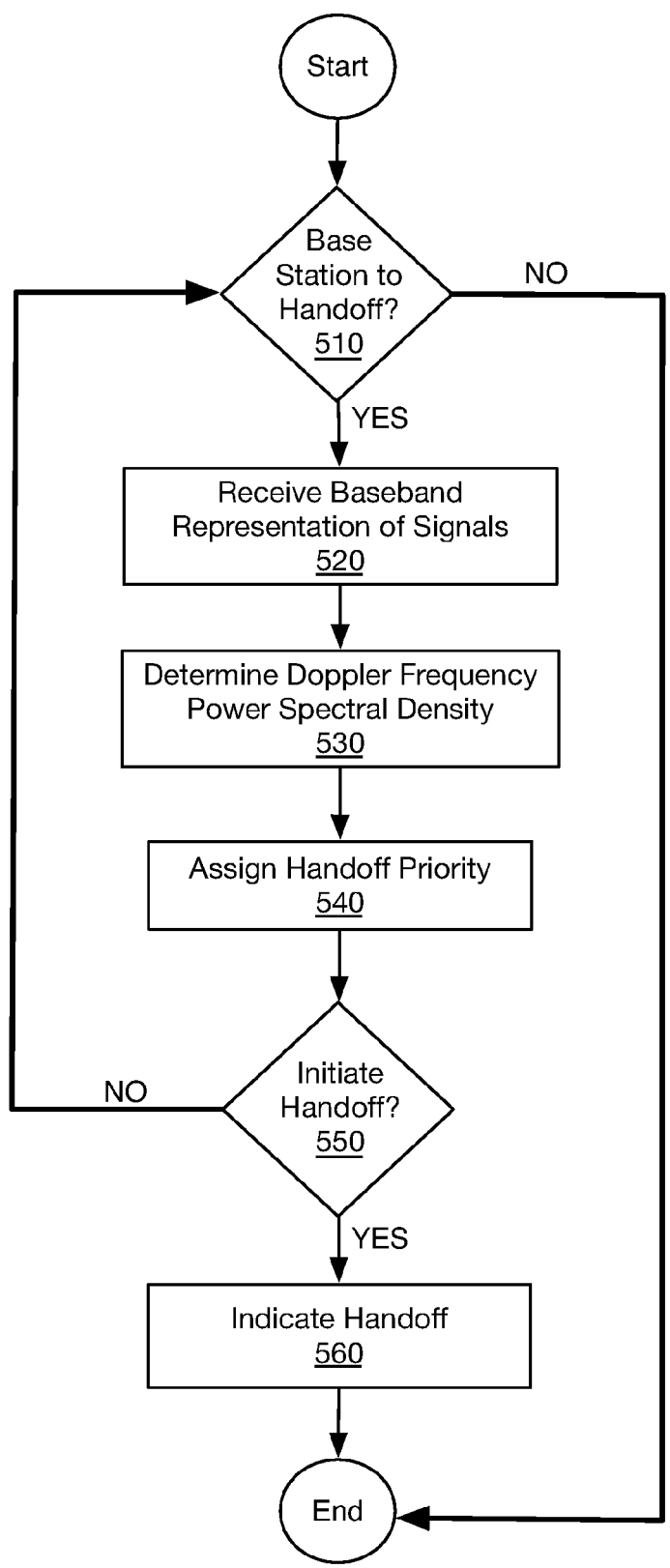
FIG. 5 illustrates a flow chart of example methods for a handoff of a mobile device in a wireless network.

FIG. 5 illustrates a flow chart of example methods for a handoff of a mobile device in a wireless network in accordance with various embodiments. In some examples, wireless networks 100 or 200 as shown in FIGS. 1-2, may be used to illustrate example methods related to the flow chart depicted in FIG. 5. A handoff manager 105 as shown in FIG. 3 may also be used to illustrate the example methods. But the described methods are not limited to implementations on wireless networks 100 or 200 as shown in FIGS. 1-2 or to the handoff manager 105 shown in FIG. 3. The example methods may be implemented on other wireless networks having one or more of the elements depicted in FIG. 1, 2 or 3.

Moving from the start to decision 510 (Base Station to Handoff?), a handoff manager 105 located with or resident on a mobile device (e.g., mobile device 110 or 210), a relay station (e.g., relay station 260) or a network controller (e.g., network controller 120 or 220) may include logic and/or features configured to determine whether a base station is available for a handoff of the mobile device (e.g., via base station feature 311). In some examples, the mobile device may be moving at a high relative velocity to a plurality of bases stations (e.g., base stations 132, 134 136, 232, 234 or 236). In some examples, the mobile device may have an active communication channel with one base station and other base stations may both be potential base stations for a handoff. If a determination is made that base stations are available for a handoff (e.g., able to at least exchange information with the mobile device), the process moves to block 520. Otherwise, the process comes to an end. The process may come to an end, for example, if the mobile device is in a remote area or in an area covered by base stations of another wireless network via which the mobile device has no ability to connect or to exchange information with.

Continuing from decision block 510 to block 520 (Receive Baseband Representation of Signals), handoff manager 105 may include logic and/or features configured to receive a baseband representation of signals (e.g., via signal feature 312). In some examples, handoff manager 105 may receive the baseband representation of signals from training symbols associated with measuring wireless communication channel conditions between the mobile device and a potential handoff base station. The training symbols may have been included in preambles for multiple received data frames or data packets exchanged between the base station and the mobile device.

Continuing from block 520 to block 530 (Determine Doppler Frequency Power Spectral Density), handoff manager 105 may include logic and/or features configured to determine a Doppler frequency power spectral density for the base station based, at least in part, on the received baseband representation of signals (e.g., via Doppler feature 314). In some examples, as mentioned previously, handoff manager 105 may be configured to determine the Doppler frequency power spectral density for the base station by using or implementing a Fourier transform algorithm such a discrete fast Fourier transform algorithm. The received baseband representation of signals may be used as inputs in the Fourier transform algorithm to determine the Doppler frequency power spectral density for the base station.

Continuing from block 530 to block 540 (Assign Handoff Priority), handoff manager 105 may include logic and/or features configured to assign a handoff priority to the base station based, at least in part, on the determined Doppler frequency power spectral density (e.g., via priority feature 216). In some examples, a handoff priority may be assigned a higher priority based one or more characteristics of the Doppler frequency power spectral density associated with the base station. The base station may be assigned a higher priority relative to the other base stations if the one or more characteristics indicate that the mobile device is moving towards the base station. The base station may also be assigned a higher priority if the Doppler frequency power spectral density for the base station has a frequency peak that is closer in proximity to a reference Doppler frequency power spectral density than frequency peaks for other base stations. Also, the base station may be assigned a higher priority if the frequency peak for the base station has a smaller frequency peak spread compared to the frequency peaks for other base stations.

Continuing from block 540 to decision block 550 (Initiate Handoff?), handoff manager 105 may include logic and/or features configured to determine whether to initiate the handoff of the mobile device to the base station based on the handoff priority (e.g., via initiate feature 318). If the handoff manager is assigned the highest handoff priority, the process moves to block 560. Otherwise, the process moves back to decision block 510.

Moving from decision block 550 to block 560 (Initiate Handoff), handoff manager 105 may include logic and/or features configured to initiate a handoff to the base station (e.g., via indicate feature 319). In some examples, handoff manager 105 may be configured to initiate the handoff of the mobile device to this base station by indicating to either the base station and/or to the mobile device that the base station has the highest assigned priority. The base station and/or the mobile device may then attempt to complete/conduct the handoff. The process then comes to an end.

FIG. 6 illustrates a block diagram of an example computer program product 600. In some examples, as shown in FIG. 6, computer program product 600 includes a signal bearing, medium 602 that may also include instructions 604 for a handoff of a mobile device (e.g., mobile device 110) in a wireless network (e.g., wireless network 100). Instructions 604, which, when executed by logic (e.g., handoff logic 210), may cause the logic to receive a baseband representation of signals determined from training symbols associated with measuring wireless communication channel conditions between the mobile device and a base station (e.g., base station 136) from among a plurality of base stations (e.g., base stations 132, 134 or 136) within the wireless network. The training symbols may have been obtained from multiple consecutive data frames or data packets exchanged between the mobile device and the plurality of base stations. The training symbols may have been obtained from multiple consecutive data frames or data packets exchanged between the mobile device and the plurality of base stations. In some examples, the mobile device may be moving at a high relative velocity. The instructions 604 may also cause the logic to determine a Doppler frequency power spectral density based, at least in part, on the baseband representation of signals and assign a handoff priority to the base station based, at least in part, on the Doppler frequency power spectral density. The instructions 604 may also cause the logic to determine whether to initiate the handoff of the mobile device to the base station based, at least in part, on the handoff priority.

Also depicted in FIG. 6, in some examples, computer product 600 may include one or more of a computer readable medium 606, a recordable medium 608 and a communications medium 610. The dotted boxes around these elements depict different types of mediums included within, but not limited to, signal bearing medium 602. These types of mediums may distribute instructions 604 to be executed by logic (e.g., handoff logic 210). Computer readable medium 606 and recordable medium 608 may include, but are not limited to, a flexible disk, a hard disk drive (HDD), a Compact Disc (CD), a Digital Versatile Disk (DVD), a digital tape, a computer memory, etc. Communications medium 610 may include, but is not limited to, a digital and/or an analog communication medium (e.g., a fiber optic cable, a waveguide, a wired communication link, a wireless communication link, etc.).

Figure 7:
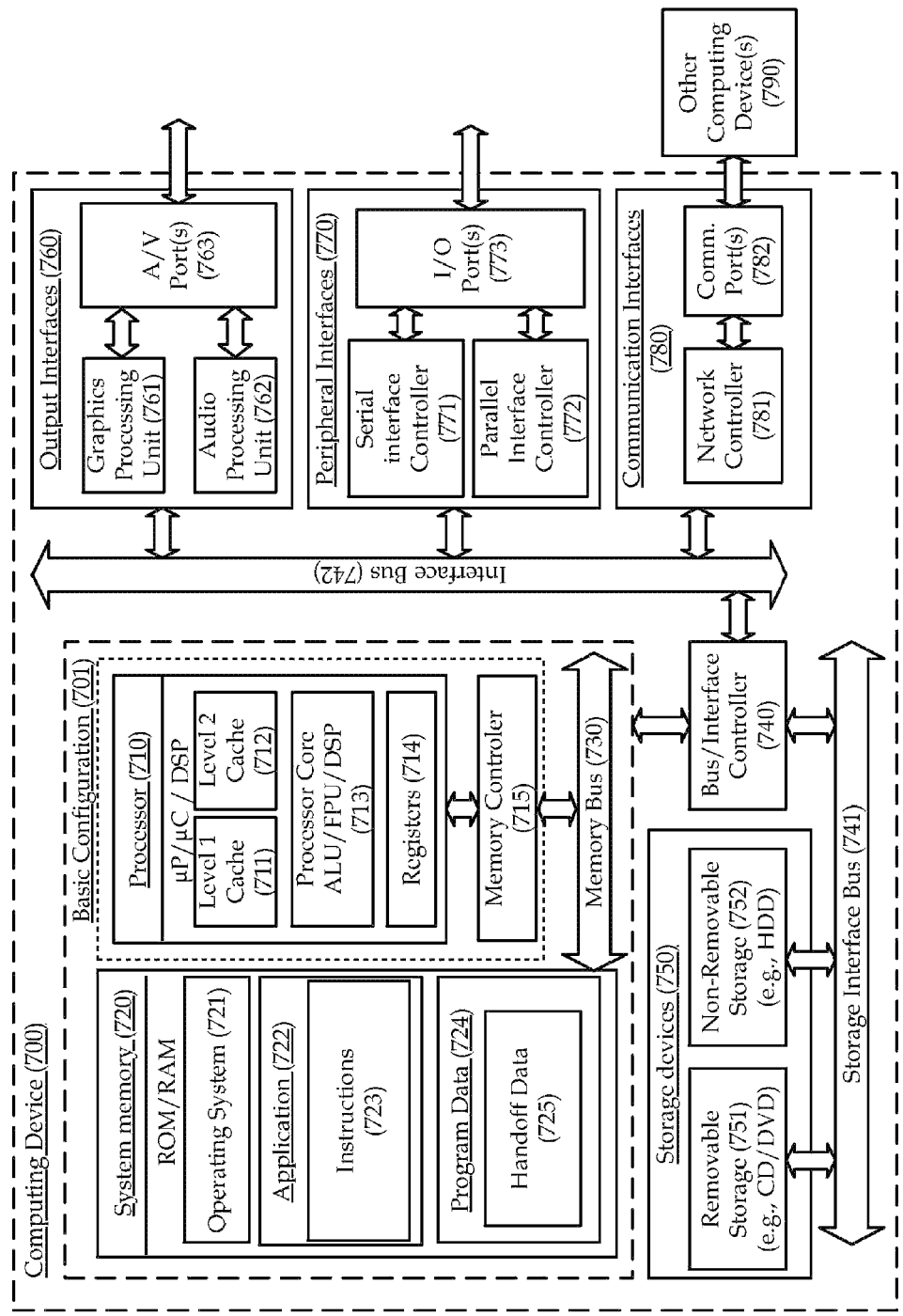
FIG. 7 illustrates an example computing device.

FIG. 7 illustrates an example computing device 700. In some examples, handoff manager 105 depicted in FIG. 1, 2 or FIG. 3 may be implemented on computing device 700. In these examples, elements of computing device 700 may be arranged or configured for a handoff of a mobile device in a wireless network. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (µP), a microcontroller (µC), a digital signal processor (DSP), or any combination thereof Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes instructions 723 that are arranged to perform the functions as described herein including the actions described with respect to handoff manager 105 architecture shown in FIG. 3 or including the actions described with respect to the flow charts shown in FIG. 5. Program Data 724 includes handoff data 725 that is useful for implementing instructions 723 (e.g., determining Doppler frequency power spectral densities, assigning handoff priorities or determining whether to initiate handoff). In some examples, application 722 can be arranged to operate with program data 724 on an operating system 721 such that implementations for instructions for a handoff of a mobile device in a wireless network may be provided as described herein. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700 (e.g., baseband representations of signals). Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output interfaces 760 include a graphics processing unit 761 and an audio processing unit 762, which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which can be arranged to facilitate communications with one or more other computing devices 790 over a network communication via one or more communication ports 782. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a personal computer including both laptop computer and non-laptop computer configurations or implemented in a workstation or a server configuration. In some examples, computing device 700 may be included in or associated with a mobile device (e.g., mobile device 110 or 210). In other examples, computing device 700 may be part of a network controller (e.g., network controller 120 or 220) for a wireless network (e.g., wireless network 100 or 200). In other examples, computing device 700 may be part of a relay station (e.g., relay station 260) for the mobile device to couple to the wireless network.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for a hand off of a mobile device in a wireless network, the method comprising:
  receiving a baseband representation of signals determined from training symbols associated with measuring wireless communication channel conditions between the mobile device and a base station from among a plurality of base stations within the wireless network, the mobile device moving at a high relative velocity;
  determining a Doppler frequency power spectral density based, at least in part, on the baseband representation of signals;
  assigning a handoff priority to the base station based, at least in part, on the Doppler frequency power spectral density; and
  determining whether to initiate the handoff of the mobile device to the base station based, at least in part, on the handoff priority,
  wherein the assigning comprises assigning a higher handoff priority to the base station relative to other base stations from among the plurality of base stations based on the Doppler frequency power spectral density for the base station having a smaller frequency spread than one or more other Doppler frequency power spectral densities associated with the other base stations.

2. The method according to claim 1, wherein the training symbols are included in preambles for data packets exchanged between the base station and the mobile device.

3. The method according to claim 1, wherein the receiving the baseband representation of signals comprises receiving the baseband representation of signals at a network controller for the wireless network, the baseband representation of signals to be received from the base station.

4. The method according to claim 3, wherein the determining whether to initiate the handoff of the mobile device to the base station based, at least in part, on the handoff priority comprises the network controller determining to initiate the handoff based, at least in part, on the base station being assigned the higher handoff priority relative to the other base stations from among the plurality of base stations.

5. The method according to claim 4, further comprising:
  initiating the handoff of the mobile device to the base station by indicating to the mobile device that the base station has the highest handoff priority, wherein the mobile device attempts to handoff to the base station.

6. The method according to claim 4, further comprising:
  initiating the handoff of the mobile device to the base station by indicating to the base station that the base station has the highest handoff priority, wherein the base station attempts to conduct a handoff with the mobile device.

7. The method according to claim 1, wherein the receiving the baseband representation of signals comprises receiving the baseband representation of signals at the mobile device.

8. The method according to claim 7, wherein the determining whether to initiate the handoff of the mobile device to the base station based, at least in part, on the handoff priority comprises the mobile device determining to initiate the handoff based, at least in part, on the base station being assigned the higher handoff priority relative to the other base stations from among the plurality of base stations.

9. The method according to claim 8, further comprising:
  initiating the handoff of the mobile device to the base station by indicating to the base station that the base station has the highest handoff priority, wherein the mobile device attempts to handoff to the base station.

10. The method according to claim 1, wherein the receiving the baseband representation of signals comprises receiving the baseband representation of signals at a relay station via which the mobile device wirelessly couples to the wireless network.

11. The method according to claim 10, wherein the determining whether to initiate the handoff of the mobile device to the base station based, at least in part, on the handoff priority comprises the relay station determining to initiate the handoff based, at least in part, on the base station being assigned the higher handoff priority relative to the other base stations from among the plurality of base stations.

12. The method according to claim 10, further comprising:
  initiating the handoff of the mobile device to the base station by indicating to the mobile device that the base station has the highest handoff priority, wherein the mobile device attempts to handoff to the base station.

13. The method according to claim 1, wherein the determining the Doppler frequency power spectral density comprises determining the Doppler frequency power using a Fourier transform algorithm.

14. The method according to claim 13, wherein the Fourier transform algorithm comprises a discrete fast Fourier transform algorithm.

15. The method according to claim 1, wherein the assigning the handoff priority to the base station based, at least in part, on the Doppler frequency power spectral density comprises assigning the higher hand off priority to the base station relative to the other base stations from among the plurality of base stations based on the Doppler frequency power spectral density indicating the mobile device is moving towards the base station.

16. The method according to claim 1, wherein the assigning the handoff priority to the base station based, at least in part, on the Doppler frequency power spectral density comprises assigning the higher handoff priority to the base station relative to the other base stations from among the plurality of base stations based on the Doppler frequency power spectral density indicating a Doppler frequency proximity to a reference Doppler frequency power spectral density that is closer than the one or more other Doppler power spectral densities associated with the other base stations.

17. An apparatus for a handoff of a mobile device in a wireless network, the apparatus comprising:
a handoff manager having logic, the logic configured to:
receive a baseband representation of signals determined from training symbols associated with measuring wireless communication channel conditions between the mobile device and a base station from among a plurality of base stations within the wireless network, the mobile device moving at a high relative velocity;
determine a Doppler frequency power spectral density based, at least in part, on the baseband representation of signals;
assign a handoff priority to the base station based, at least in part, on the Doppler frequency power spectral density; and
determine whether to initiate the handoff of the mobile device to the base station based, at least in part, on the handoff priority,
wherein the logic configured to assign the handoff priority to the base station comprises logic configured to assign a higher handoff priority to the base station relative to other base stations from among the plurality of base stations based on the Doppler frequency power spectral density for the base station having a smaller frequency spread than one or more other Doppler frequency power spectral densities associated with the other base stations.

18. The apparatus according to claim 17, wherein the training symbols are included in preambles for data packets exchanged between the base station and the mobile device.

19. The apparatus according to claim 17, wherein the handoff manager is resident at a network controller for the wireless network.

20. The apparatus according to claim 18, wherein the logic configured to determine whether to initiate the handoff of the mobile device to the base station based, at least in part, on the handoff priority comprises the logic configured to determine to initiate the handoff based, at least in part, on the base station being assigned the higher handoff priority relative to the other base stations from among the plurality of base stations.

21. The apparatus according to claim 20, further comprising the logic configured to:
initiate the handoff of the mobile device to the base station by indicating to the mobile device that the base station has the highest handoff priority, wherein the mobile device attempts to handoff to the base station.

22. The apparatus according to claim 20, further comprising the logic configured to:
initiate the hand off of the mobile device to the base station by indicating to the base station that the base station has the highest handoff priority, wherein the base station attempts to conduct a handoff with the mobile device.

23. The apparatus according to claim 17, wherein the handoff manager is resident at the mobile device.

24. The apparatus according to claim 23, wherein the logic configured to determine whether to initiate the handoff of the mobile device to the base station based, at least in part, on the handoff priority comprises the logic configured to determine to initiate the handoff based, at least in part, on the base station being assigned the higher handoff priority relative to the other base stations from among the plurality of base stations.

25. The apparatus according to claim 24, further comprising the logic configured to:
initiate the handoff of the mobile device to the base station by indicating to the mobile device that the base station has the highest handoff priority, wherein the mobile device attempts to handoff to the base station.

26. The apparatus according to claim 24, further comprising the logic configured to:
initiate the handoff of the mobile device to the base station by indicating to the base station that the base station has the highest handoff priority, wherein the base station attempts to conduct a handoff with the mobile device.

27. The apparatus according to claim 17, wherein the logic configured to assign the handoff priority to the base station based, at least in part, on the Doppler frequency power spectral density comprises the logic configured to assign the higher handoff priority to the base station relative to the other base stations from among the plurality of base stations based on the Doppler frequency power spectral density indicating the mobile device is moving towards the base station.

28. A system for a handoff of a mobile device in a wireless network, the system comprising:
an antenna to receive a baseband representation of signals determined from training symbols associated with measuring wireless communication channel conditions between the mobile device and a base station from among a plurality of base stations within the wireless network, the mobile device moving at a high relative velocity; and
a handoff manager having logic, the logic configured to:
determine a Doppler frequency power spectral density based, at least in part, on the baseband representation of signals;
assign a handoff priority to the base station based, at least in part, on the Doppler frequency power spectral density; and
determine whether to initiate the handoff of the mobile device to the base station based, at least in part, on the handoff priority,
wherein the logic configured to assign the handoff priority to the base station comprises logic configured to assign a higher handoff priority to the base station relative to other base stations from among the plurality of base stations based on the Doppler frequency power spectral density for the base station having a smaller frequency spread than one or more other Doppler frequency power spectral densities associated with the other base stations.

29. The system according to claim 28, wherein the training symbols are included in preambles for data packets exchanged between the base station and the mobile device.

30. The system according to claim 28, wherein the antenna and the handoff manager are resident at a network controller for the wireless network.

31. The system according to claim 30, wherein the logic configured to determine whether to initiate the handoff of the mobile device to the base station based, at least in part, on the handoff priority comprises the logic configured to determine to initiate the handoff based, at least in part, on the base station being assigned the higher handoff priority relative to the other base stations from among the plurality of base stations.

32. The system according to claim 28, wherein the antenna and the handoff manager are resident at the mobile device.

33. The system according to claim 32, wherein the logic configured to determine whether to initiate the handoff of the mobile device to the base station based, at least in part, on the handoff priority comprises the logic configured to determine to initiate the handoff based, at least in part, on the base station being assigned the higher handoff priority relative to the other base stations from among the plurality of base stations.

34. The system according to claim 28, wherein the antenna and the handoff manager are resident at a relay station via which the mobile devise wirelessly couples to the wireless network.

35. The system according to claim 28, wherein the logic configured to determine whether to initiate the handoff of the mobile device to the base station based, at least in part, on the handoff priority comprises the logic configured to determine to initiate the handoff based, at least in part, on the base station being assigned the higher handoff priority relative to the other base stations from among the plurality of base stations.

36. The system according to claim 28, wherein the logic configured to assign the handoff priority to the base station based, at least in part, on the Doppler frequency power spectral density comprises the logic configured to assign the higher handoff priority to the base station relative to the other base stations from among the plurality of base stations based on the Doppler frequency power spectral density indicating the mobile device is moving towards the base station.

37. A computer program product comprising a non-transitory medium having instructions for a handoff of a mobile device in a wireless network, which, when executed by logic, cause the logic to:
receive a baseband representation of signals determined from training symbols associated with measuring wireless communication channel conditions between the mobile device and a base station from among a plurality of base stations within the wireless network, the mobile device moving at a high relative velocity;
determine a Doppler frequency power spectral density based, at least in part, on the baseband representation of signals;
assign a handoff priority to the base station based, at least in part, on the Doppler frequency power spectral density; and
determine whether to initiate the handoff of the mobile device to the base station based, at least in part, on the handoff priority,
wherein the instruction to cause the logic to assign the handoff priority to the base station comprises an instruction to further cause the logic to assign a higher handoff priority to the base station relative to other base stations from among the plurality of base stations based on the Doppler frequency power spectral density for the base station having a smaller frequency spread than one or more other Doppler frequency power spectral densities associated with the other base stations.

38. The computer program product according to claim 37, wherein the training symbols are included in preambles for data packets exchanged between the base station and the mobile device.

39. The computer program product according to claim 37, wherein the instruction to cause the logic to assign the handoff priority to the base station based, at least in part, on the Doppler frequency power spectral density comprises the instruction to further cause the logic to assign the higher handoff priority to the base station relative to the other base stations from among the plurality of base stations based on the Doppler frequency power spectral density indicating the mobile device is moving towards the base station.

* * * * *